(12) United States Patent
Carpenter et al.

(10) Patent No.: US 8,212,537 B2
(45) Date of Patent: Jul. 3, 2012

(54) INTEGRATABLE EFFICIENT SWITCHING DOWN CONVERTER

(75) Inventors: Gary D. Carpenter, Austin, TX (US); Wonyoung Kim, Cambridge, MA (US); Brian L. Ji, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/508,235

(22) Filed: Jul. 23, 2009

(65) Prior Publication Data

US 2011/0018511 A1 Jan. 27, 2011

(51) Int. Cl.
*G05F 1/10* (2006.01)
*G05F 1/40* (2006.01)

(52) U.S. Cl. .......................... 323/225; 323/222; 323/271

(58) Field of Classification Search .................. 323/222, 323/223, 225, 268, 271, 282

See application file for complete search history.

(56) References Cited

U.S. PATENT DOCUMENTS

| 7,292,462 B2* | 11/2007 | Watanabe et al. ............... 363/60 |
| 7,402,912 B2 | 7/2008 | Bartley et al. .................. 257/777 |
| 7,965,069 B2* | 6/2011 | Watanabe et al. ............. 323/284 |
| 2006/0071650 A1 | 4/2006 | Narendra et al. ............. 323/285 |
| 2006/0099734 A1 | 5/2006 | Narendra et al. ............. 438/107 |
| 2008/0239772 A1 | 10/2008 | Oraw et al. .................... 363/60 |

* cited by examiner

*Primary Examiner* — Matthew Nguyen
(74) *Attorney, Agent, or Firm* — Ido Tuchman; Libby Z. Toub

(57) ABSTRACT

A converter circuit and methods for operating the same. The converter circuit includes a supply voltage, a capacitor, an inductor, and four stacked switching elements. Each switching element is adjustable from a low resistance state to a high resistance state by a control signal. The inductor outputs current to a circuit load. The circuit may be operated in a first mode such that the output is adjustable between the supply voltage and half the supply voltage. Alternatively, in a second mode of operation, the output is adjustable from half the supply voltage to a ground voltage.

13 Claims, 11 Drawing Sheets

INTEGRATABLE EFFICIENT SWITCHING DOWN CONVERTER

BACKGROUND OF THE INVENTION

1. Field of the Invention

The present invention relates to power supplies and, more particularly, a down converter circuit and methods for operating the same.

2. Description of Background

Chip manufactures often look for ways to increase the functionality delivered by their integrated circuits. One way of increasing functionality is to operate integrated circuits at higher frequencies. However, circuits operating at higher frequencies typically consume more power and generate higher amounts of heat. Dissipating large amounts of heat from small circuit areas can often be difficult.

One method of decreasing the amount of heat generated by an integrated circuit is to lower the operating voltage of the circuit. Lowering the operating voltage of integrated circuits can introduce new sets of problems, such as effective power distribution across the chip due to resistive losses.

One solution for efficient the power distribution is to distribute a relatively high voltage to the chip and use down converters to lower the supply voltage at various chip locations. The present invention discloses an efficient down converter circuit that can be used on integrated circuits.

SUMMARY OF THE INVENTION

An aspect of the invention is voltage converter circuit. The voltage converter includes a supply node receiving a supply voltage and a ground node receiving a ground voltage. The circuit includes four stacked switching elements: a supply switching element, a top switching element, a bottom switching element, and a ground switching element.

The supply switching element includes a first supply terminal, a second supply terminal and a supply control terminal. The first supply terminal is electrically connected to the supply node. The supply control terminal receives a first control signal. The supply control terminal controls the resistance between the first supply terminal and the second supply terminal.

The top switching element includes a first top terminal, a second top terminal and a top control terminal. The first top terminal is electrically connected to the second supply terminal. The top control terminal receives a second control signal. The top control terminal controls the resistance between the first top terminal and the second top terminal.

The bottom switching element includes a first bottom terminal, a second bottom terminal and a bottom control terminal. The first bottom terminal is electrically connected to the second top terminal. The bottom control terminal receives a third control signal. The bottom control terminal controls the resistance between the first bottom terminal and the second bottom terminal.

The ground switching element includes a first ground terminal, a second ground terminal and a ground control terminal. The first ground terminal is electrically connected to the second bottom terminal. The second ground terminal is electrically connected to the ground node. The ground control terminal receives a fourth control signal. The ground control terminal controls the resistance between the first ground terminal and the second ground terminal.

The circuit also includes an output node substantially adjustable between the supply voltage and the ground voltage. The voltage at the output node is controlled by application of the first, second, third and fourth control signals.

A switching capacitor at the circuit includes a first switching capacitor terminal and a second switching capacitor terminal. The first switching capacitor terminal is electrically connected to the second source terminal and the first top terminal. The second switching capacitor terminal is electrically connected to the second bottom terminal and the first ground terminal.

An inductor at the circuit includes a first inductor terminal and a second inductor terminal. The first inductor terminal is electrically connected to the second top terminal and the first bottom terminal. The second inductor terminal is electrically connected to the output node.

A load capacitor at the circuit includes a first load capacitor terminal and a second load capacitor terminal. The first load capacitor terminal is electrically connected to the second inductor terminal and the output node. The second load capacitor terminal connected to the ground node.

Another embodiment of the invention is a method of operating a converter circuit. The converter circuit includes a supply voltage, a capacitor and an inductor. The inductor outputs current to a circuit load. The method includes collapsing a magnetic field in the inductor by discharging the capacitor through the inductor for a first duration of time during a first phase of operation. Next, a step of increasing the magnetic field in the inductor without discharging the capacitor for a second duration of time during a second phase of operation is performed. Next, a step of charging the capacitor and increasing a magnetic field in the inductor by the supply voltage for a third duration of time during a third phase of operation is performed. Next, a step of increasing the magnetic field in the inductor without discharging the capacitor for a fourth duration of time during a fourth phase of operation is performed. The method includes cycling through the first, second, third and fourth phases of operation in sequence.

Yet another embodiment of the invention is a method of operating a converter circuit. The converter circuit includes a supply voltage, a capacitor and an inductor. The inductor outputs current to a circuit load. The method includes charging the capacitor and increasing a magnetic field in the inductor by the supply voltage for a first duration of time during a first phase of operation. Next, a step of collapsing the magnetic field in the inductor without discharging the capacitor for a second duration of time during a second phase of operation is performed. Next, a step of increasing the magnetic field in the inductor by discharging the capacitor through the inductor for a third duration of time during a third phase of operation is performed. Next, a step of collapsing the magnetic field in the inductor without discharging the capacitor for a fourth duration of time during a fourth phase of operation is performed. The method includes cycling through the first, second, third and fourth phases of operation in sequence.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-11.

Figure 1:
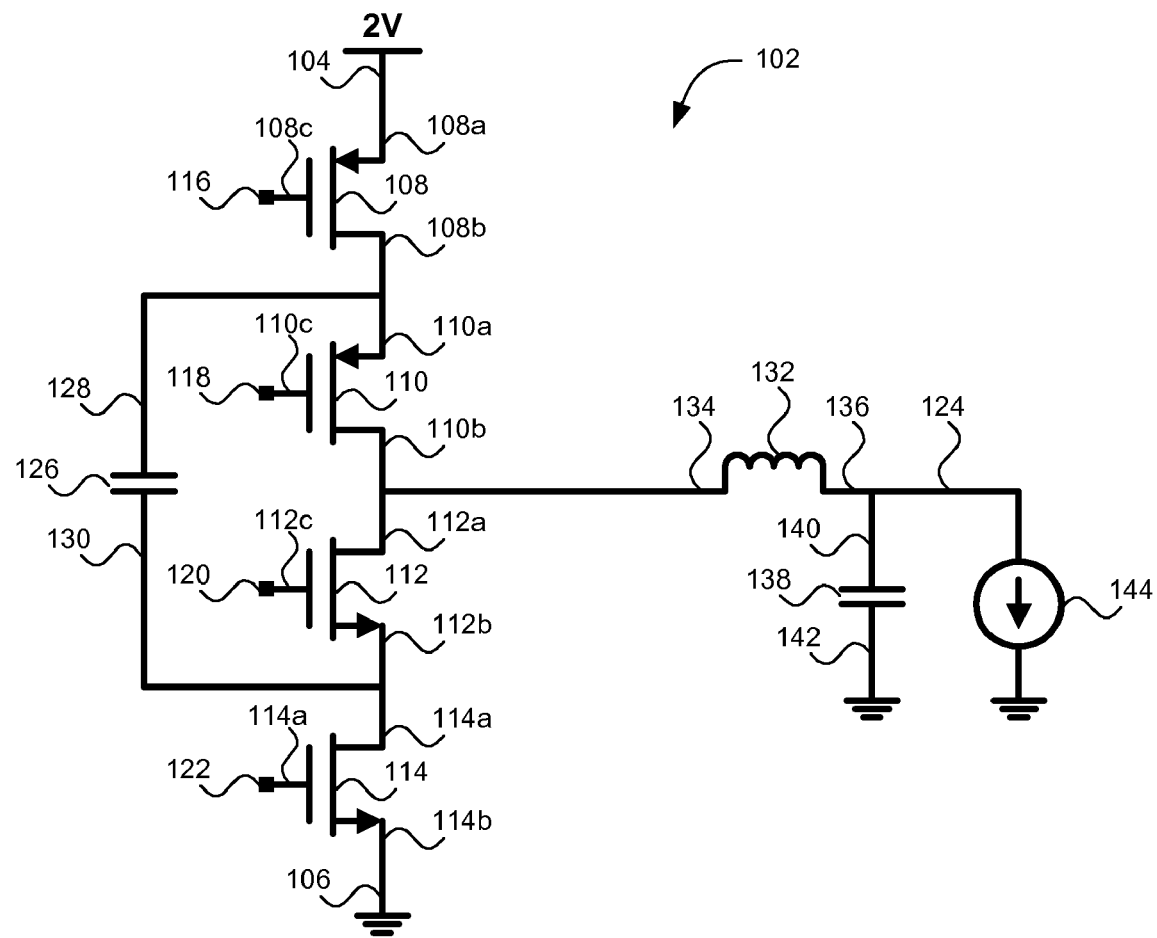
FIG. 1 shows an example of a voltage converter circuit contemplated by the present invention.

Turning to FIG. 1, an example of a voltage down converter circuit 102 contemplated by the present invention is shown. The voltage converter circuit 102 can be integrated in a chip to allow for efficient power distribution to various chip circuits.

The voltage converter circuit 102 includes a supply node 104 receiving a supply voltage. For illustration purposes, the supply voltage is shown to be two volts. It is noted that the actual supply voltage is dictated by design requirements and is not limited to a specific value. The circuit also includes a ground node 106 receiving a ground (zero) voltage.

The voltage converter circuit 102 includes four stacked switching elements 108, 110, 112 and 114. Each switching element contains a first terminal, a second terminal and a control terminal. The control terminal controls the resistance between the first terminal and the second terminal.

It is contemplated that various switching elements known in the art may be used by the present invention. The switching elements may be transistors, such as field effect transistors (FETs), metal-oxide-semiconductor field-effect transistors (MOSFETs), and bipolar junction transistors (BJTs).

For example, a supply switching element 108 in FIG. 1 is illustrated as an n-channel power MOSFET with the first supply terminal 108a being the source, the second supply terminal 108b being the drain, and the supply control terminal 108c being the gate. The supply control terminal 108c receives a first control signal 116 and the first supply terminal 108a is electrically connected to the supply node 104. Those skilled in the art will recognize that other equivalent circuit configurations can be realized using different switching elements. Such equivalent circuit configurations are contemplated to be within the scope of the claimed invention.

A top switching element 110 includes a first top terminal 110a, a second top terminal 110b and a top control terminal 110c. The first top terminal 110a is electrically connected to the second supply terminal 108b. The top control terminal 110c receiving a second control signal 118 and controls the resistance between the first top terminal 110a and the second top terminal 110b.

A bottom switching element 112 includes a first bottom terminal 112a, a second bottom terminal 112b and a bottom control terminal 112c. The first bottom terminal 112a is electrically connected to the second top terminal 110b. The bottom control terminal 112c receives a third control signal 120 and controls the resistance between the first bottom terminal 112a and the second bottom terminal 112b.

A ground switching element 114 includes first ground terminal 114a, a second ground terminal 114b and a ground control terminal 114c. The first ground terminal 114a is electrically connected to the second bottom terminal 112b and the second ground terminal 114b is electrically connected to the ground node 106. The ground control terminal 114c receives a fourth control signal and controls the resistance between the first ground terminal 114a and the second ground terminal 114b.

An output node 124 is substantially adjustable between the supply voltage and the ground voltage. As discussed in more detail below, the voltage at the output node 124 is controlled by application of the first, second, third and fourth control signals 116, 118, 120 and 122.

A switching capacitor 126 has a first switching capacitor terminal 128 and a second switching capacitor terminal 130. The first switching capacitor terminal 128 is electrically connected to the second source terminal 108b and the first top terminal 110a. The second switching capacitor terminal 130 is electrically connected to the second bottom terminal 112b and the first ground terminal 114a.

An inductor 132 includes a first inductor terminal 134 and a second inductor terminal 136. The first inductor terminal 134 is electrically connected to the second top terminal 110b and the first bottom terminal 112a. The second inductor terminal 136 is electrically connected to the output node 124.

A load capacitor 138 includes a first load capacitor terminal 140 and a second load capacitor terminal 142, the first load capacitor terminal 140 is electrically connected to the second inductor terminal 136 and the output node 124. The second load capacitor terminal 142 is connected to the ground node 106. Furthermore, the circuit load 144 is represented as a constant current source electrically coupled between the output node 124 and the ground node 106.

As mentioned above, the voltage at the output node 124 is controlled by application of the first, second, third and fourth control signals 116, 118, 120 and 122. The control signals turn the switching elements "on" and "off" at various phases of operation. As used herein, when a switching element is "on", the resistance between the first and second terminals is low (typically less than a few ohms). Furthermore, when a switching element is "off", the resistance between the first and second terminals is high (typically greater than 1M ohms).

During operation, the four control signals cycle the switching elements through four sequential phases of operation. Each phase constitutes a particular on-off arrangement of the switching elements. Furthermore, the particular on-off arrangement used depends on the desired voltage at the output node 124.

If the desired voltage at the output node 124 falls between the supply voltage and half the supply voltage, a first set of four operation phases is cycled through by the voltage converter circuit. This first set of operation phases is shown in FIGS. 2-5. If the voltage range of at output node 124 is between the half the supply voltage and ground, a second set of four operation phases is cycled through by the voltage converter circuit. The second set of operation phases is shown in FIGS. 6-9.

Figure 2A:
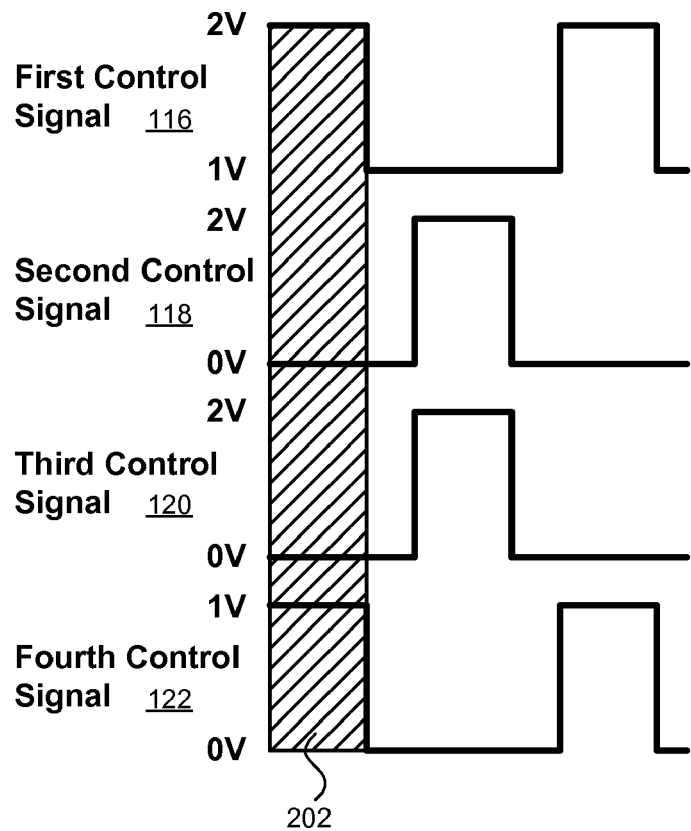
FIGS. 2A and 2B show a first phase of four operational phases of the voltage converter circuit when the desired voltage at the output node is between the supply voltage and half the supply voltage.
Figure 2B:
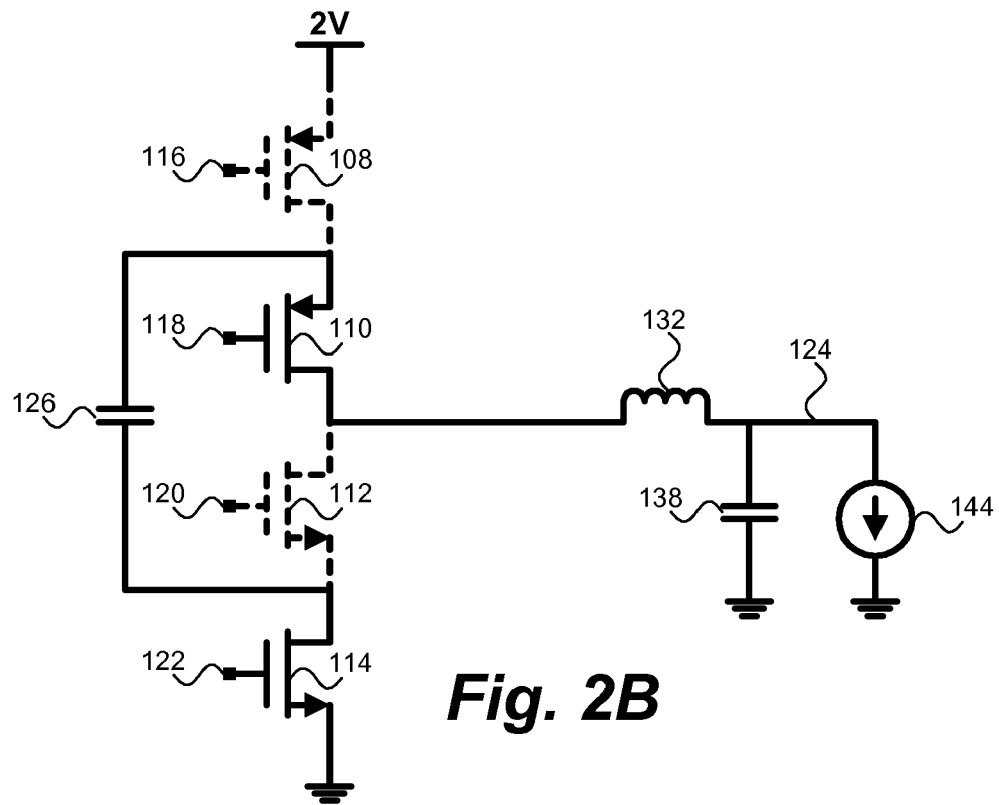

FIGS. 2A and 2B show the first phase 202 of the four operational phases when the desired voltage at the output node 124 is between the supply voltage and half the supply voltage. During the first phase of operation, the first control signal 116 is set to the supply voltage, the second control signal 118 is set to the ground voltage, the third control signal 120 is set to the ground voltage, and the fourth control 122 signal is set to half the supply voltage. This causes the top switching element 110 and the ground switching element 114 to be on, and the supply switching element 108 and the bottom switching element 112 to be off (shown as dotted lines in FIG. 2B).

During the first phase 202 of operation the first, second, third and fourth control signals cause the inductor 132 to drive a drive current to the output node 124 from the switching capacitor 126. The top switching element 110 couples the switching capacitor 126 in series with the inductor 132. Thus, the switching capacitor 126 supplies energy to the load 144 through the inductor 132. After the first phase 202 is completed, the control signals 116, 118, 120 and 122 enter a second phase of operation.

Figure 3A:
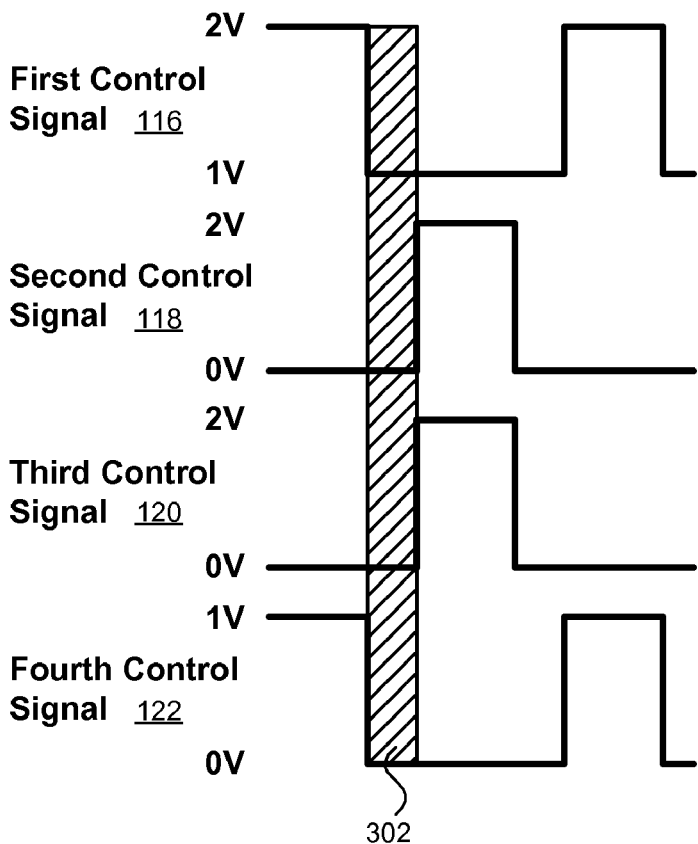
FIGS. 3A and 3B show a second phase of four operational phases of the voltage converter circuit when the desired voltage at the output node is between the supply voltage and half the supply voltage.
Figure 3B:
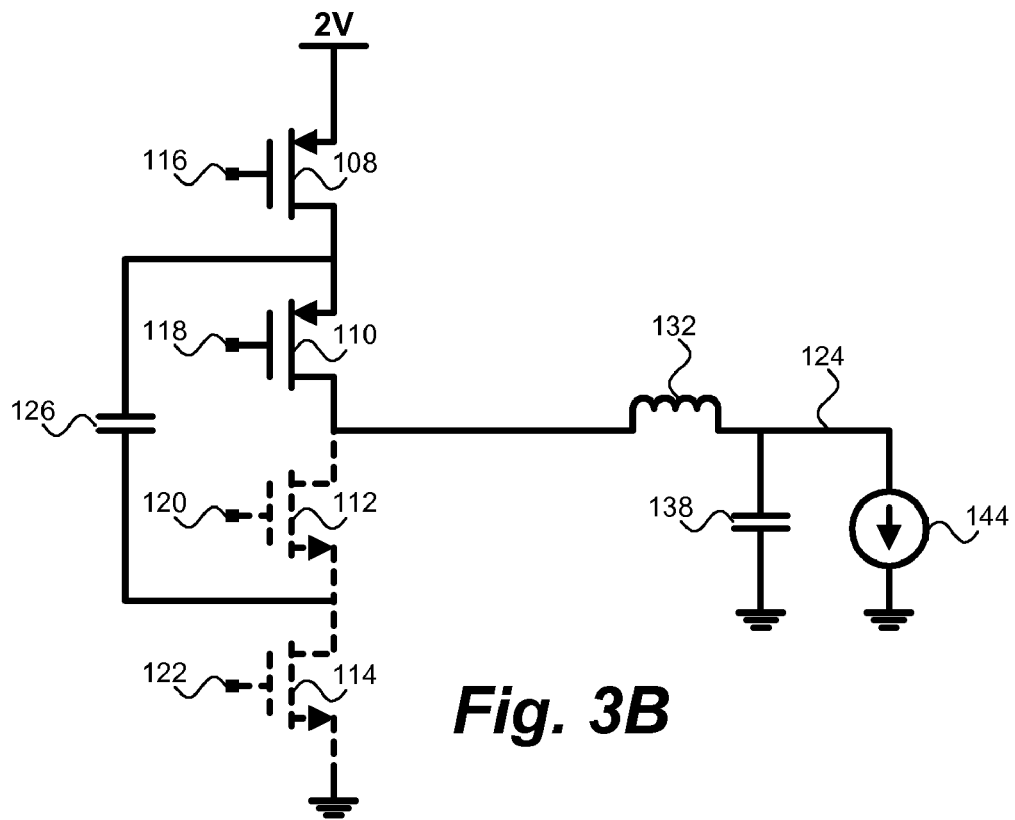

FIGS. 3A and 3B show the second phase 302 of the four operational phases when the desired voltage at the output node 124 is between the supply voltage and half the supply voltage. During the second phase of operation, the first control signal 116 is set to half the supply voltage, and the second control signal 118, the third control signal 120 and the fourth control 122 signal are set to ground voltage. This causes the supply switching element 108 and the top switching element 110 to be on, and the bottom switching element 112 and the ground switching element 114 to be off (shown as dotted lines in FIG. 3B).

During this phase, the switching capacitor 126 is disconnected. The source switching element 108 and the top switching element 110 drive the voltage on one side of the inductor to 2V, establishing more current in the inductor 132 and pushing the voltage at the output node above 1V. Thus, during the second phase of operation, the first, second, third and fourth control signals 116, 118, 120 and 122 cause the inductor 132 to drive the drive current to the output node 124 from the supply voltage node. After the second phase 302 is completed, the control signals 116, 118, 120 and 122 enter a third phase of operation.

Figure 4A:
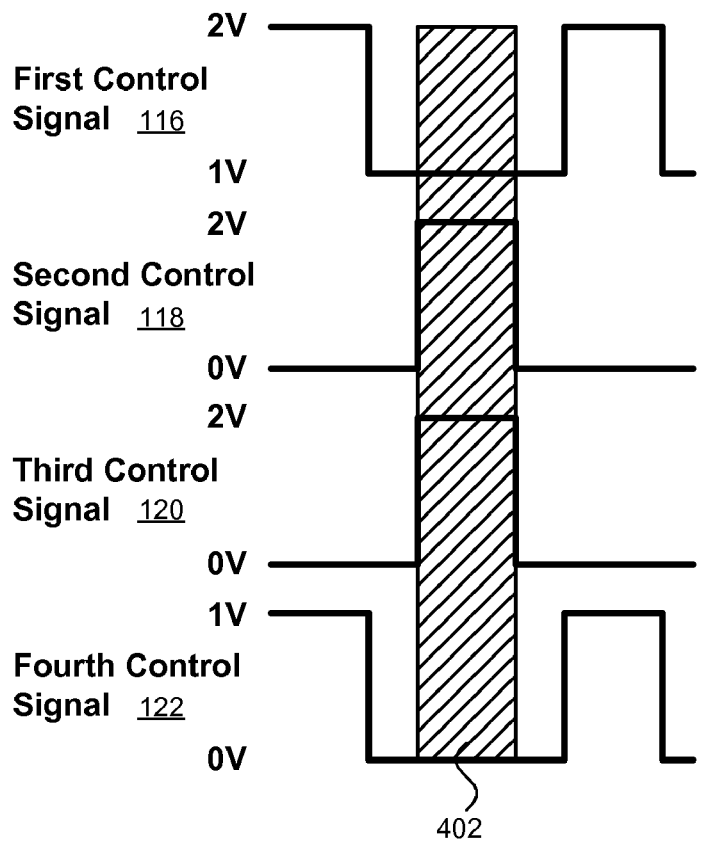
FIGS. 4A and 4B show a third phase of four operational phases of the voltage converter circuit when the desired voltage at the output node is between the supply voltage and half the supply voltage.
Figure 4B:
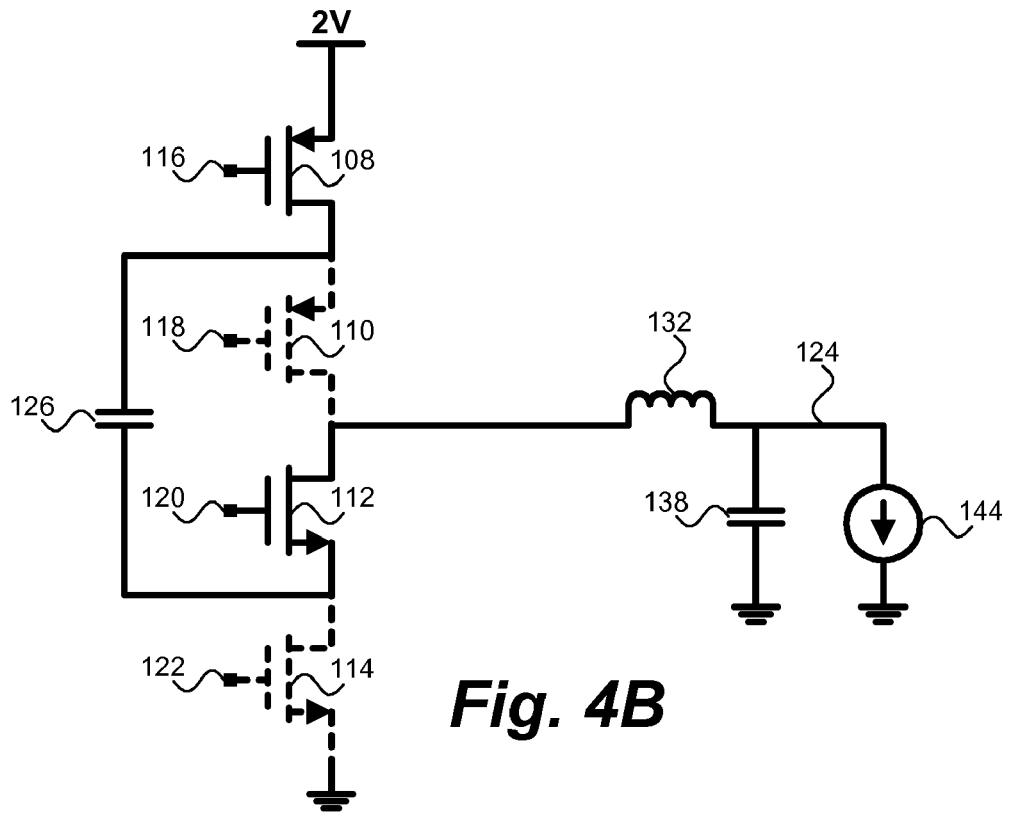

FIGS. 4A and 4B show the third phase 402 of the four operational phases when the desired voltage at the output node 124 is between the supply voltage and half the supply voltage. During the third phase of operation, the first control signal 116 is set to half the supply voltage, the second control signal 118 is set to the supply voltage, the third control signal 120 is set to the supply voltage, and the fourth control 122 signal is set to the ground voltage. This causes the supply switching element 108 and the bottom switching element 112 to be on, and the top switching element 110 and the ground switching element 114 to be off (shown as dotted lines in FIG. 4B).

During this phase, the switching capacitor 126 is placed between the power supply and the inductor 132. Current through the inductor 132 established in the previous phase causes a charge across the switching capacitor 126. Thus, the first, second, third and fourth control signals 116, 118, 120 and 122 cause the switching capacitor 136 and the inductor 132 to be coupled in series circuit such that the drive current passes from the supply node through the switching capacitor 136 and the inductor 132 to the output node 124. Moreover, during the third phase 402 the switching capacitor 136 is charged by the drive current. After the third phase 402 is completed, the control signals 116, 118, 120 and 122 enter a fourth phase of operation.

Figure 5A:
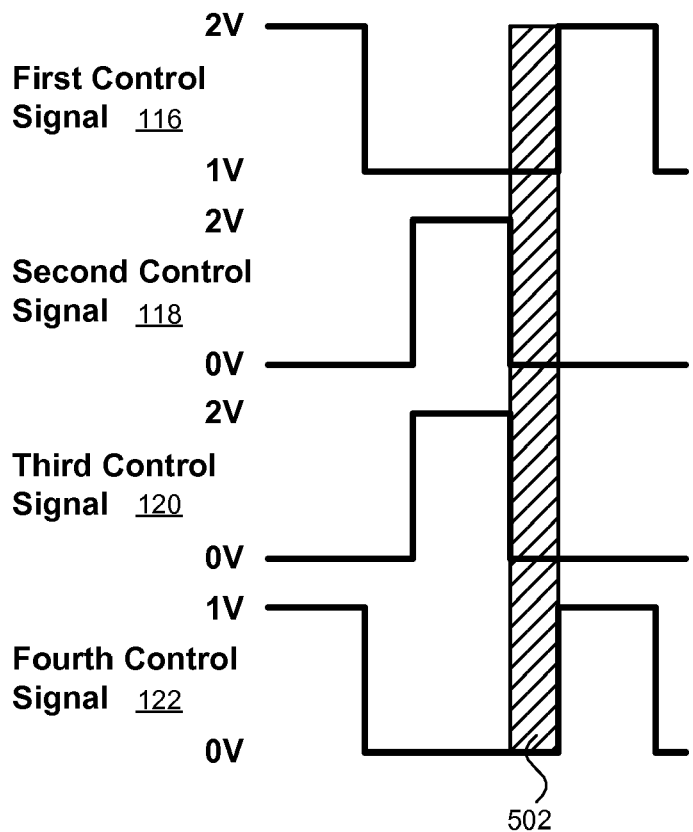
FIGS. 5A and 5B show a fourth phase of four operational phases of the voltage converter circuit when the desired voltage at the output node is between the supply voltage and half the supply voltage.
Figure 5B:
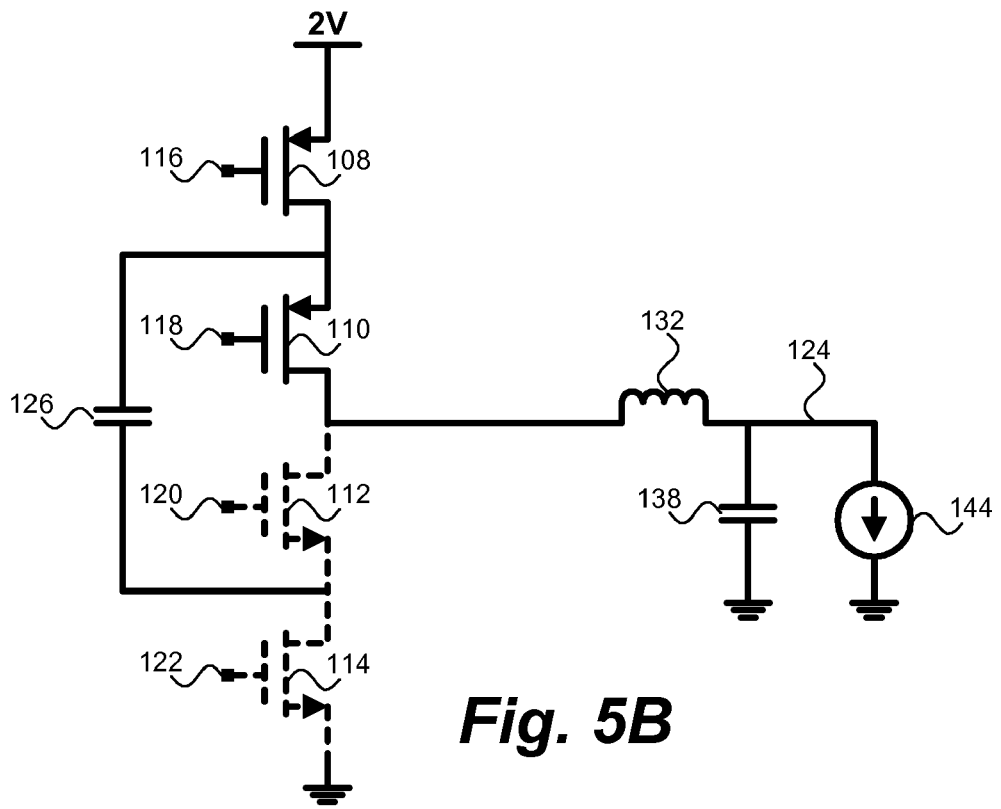

FIGS. 5A and 5B show the third phase 502 of the four operational phases when the desired voltage at the output node 124 is between the supply voltage and half the supply voltage. During the fourth phase of operation, the first control signal 116 is set to half the supply voltage, and the second control signal 118, the third control signal 120 and the fourth control 122 signal are set to ground voltage. This causes the supply switching element 108 and the top switching element 110 to be on, and the bottom switching element 112 and the ground switching element 114 to be off (shown as dotted lines in FIG. 5B).

During this phase, the switching capacitor 126 is again disconnected. Current is provided through the inductor 132. The source switching element 108 and the top switching element 110 drive the voltage on one side of the inductor to 2V, establishing more current in the inductor 132 and pushing the voltage at the output node above 1V. Thus, during the fourth phase of operation, the first, second, third and fourth control signals cause the inductor 132 to drive the drive current to the output node 124 from the supply voltage node. After this phase is completed, the control signals 116, 118, 120 and 122 cycle back to the first phase 202.

Those skilled in the art will recognize that as the duty cycle of the second phase 302 and the fourth phase 502 is increased, the output node 124 moves closer to the supply voltage (i.e., 2V). Conversely, as the duty cycle of the second phase 302 and the fourth phase 502 is decreased, the output node 124 moves closer to half the supply voltage (i.e., 1V). Adjusting the duty cycle of the second phase 302 and the fourth phase 502 adjusts the voltage at the output node 124 between the supply voltage and half the supply voltage. Thus, the output voltage at the circuit load is proportional to a ratio of the duty cycle of the first and third phases of operation to the duty cycle of the second and fourth phases of operation.

Figure 6A:
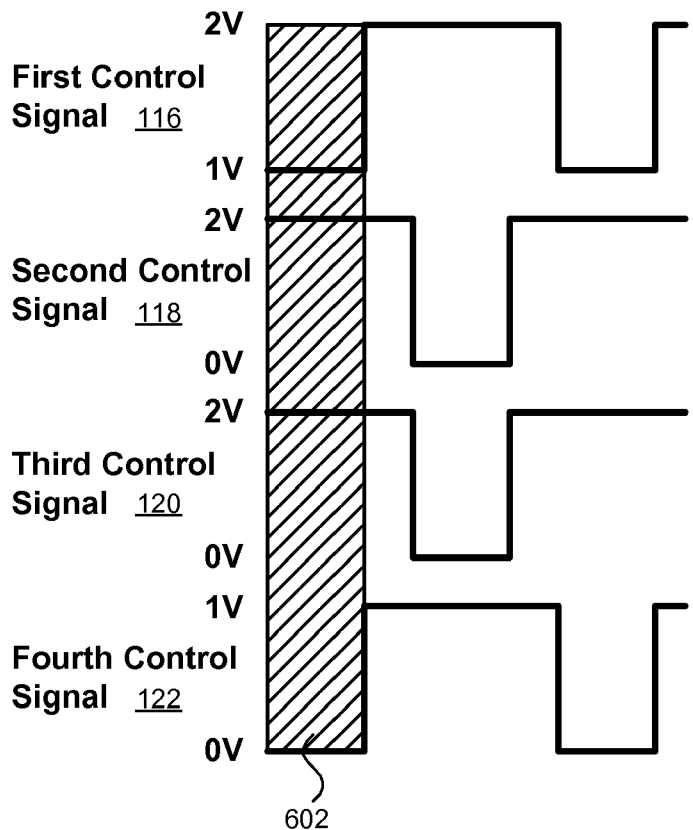
FIGS. 6A and 6B show a first phase of four operational phases of the voltage converter circuit when the desired voltage at the output node is between half the supply voltage and the ground voltage.
Figure 6B:
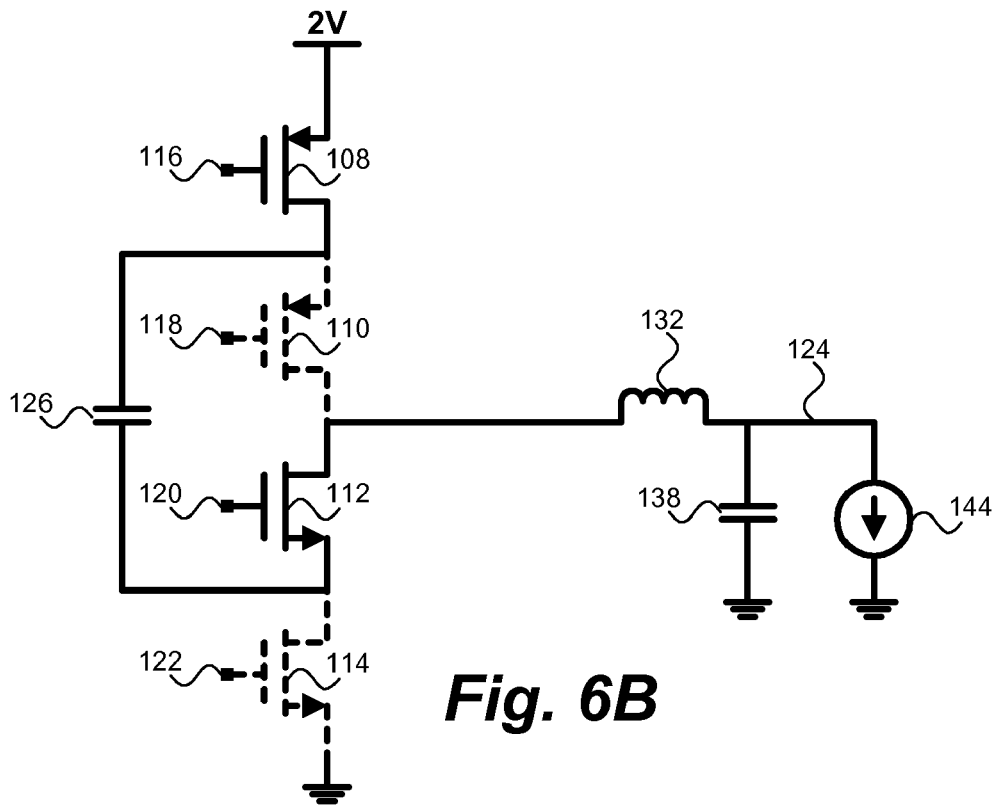

FIGS. 6A and 6B show the first phase 602 of the four operational phases when the desired voltage at the output node 124 is between half the supply voltage and the ground voltage. During the first phase of operation, the first control signal 116 is set to half the supply voltage, the second control signal 118 is set to the supply voltage, the third control signal 120 is set to the supply voltage, and the fourth control signal 122 is set to the ground voltage. This causes the supply switching element 108 and the bottom switching element 112 to be on, and the supply top element 110 and the ground switching element 114 to be off (shown as dotted lines in FIG. 6B).

During this phase, the first, second, third and fourth control signals 116, 118, 120 and 122 cause the switching capacitor and the inductor to be coupled in series circuit to the supply node 104. A drive current passes from the supply node through the switching capacitor and the inductor to the output node and such that the switching capacitor is charged by the drive current. Thus, the switching capacitor 126 is being charged and the magnetic field in the inductor 132 is increased. After the first phase 602 is completed, the control signals 116, 118, 120 and 122 enter a second phase of operation.

Figure 7A:
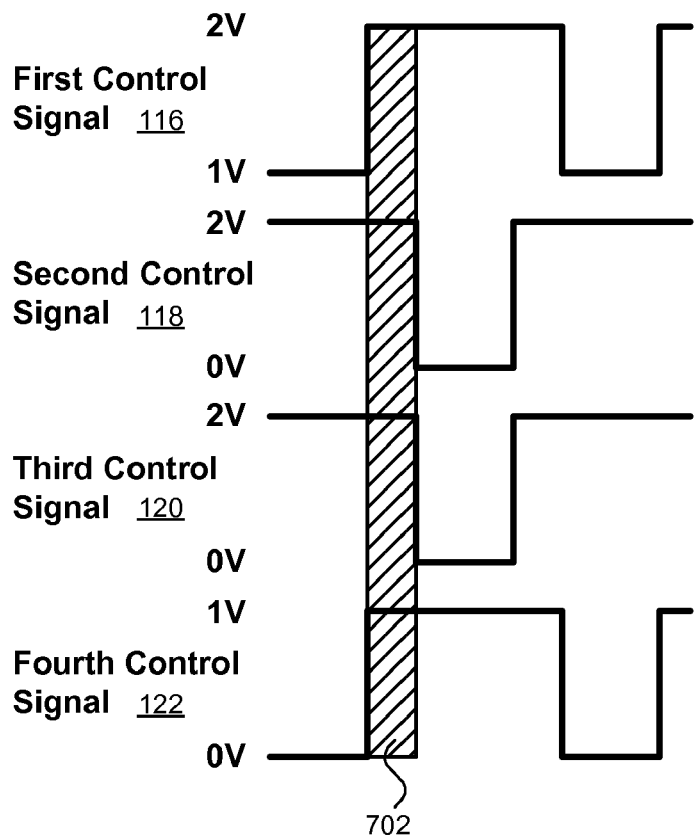
FIGS. 7A and 7B show a second phase of four operational phases of the voltage converter circuit when the desired voltage at the output node is between half the supply voltage and the ground voltage.
Figure 7B:
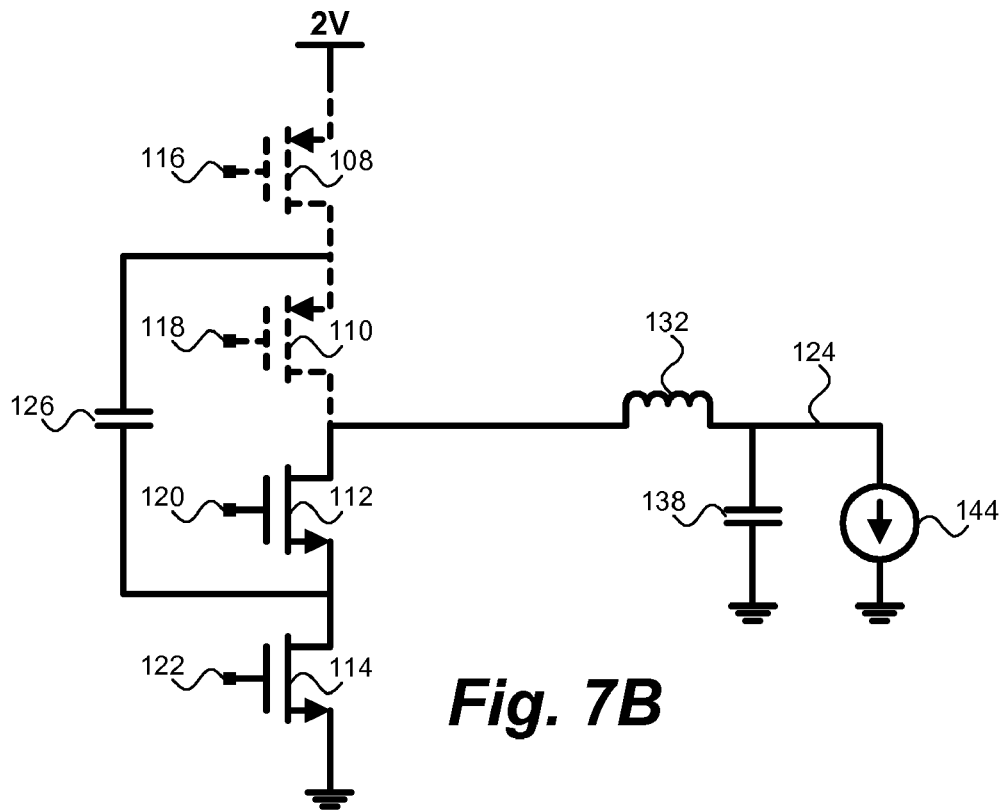

FIGS. 7A and 7B show the second phase 702 of the four operational phases when the desired voltage at the output node 124 is between half the supply voltage and the ground voltage. During the second phase 702 of operation, the first control signal 116 is set to the supply voltage, and the second control signal 118 is set to the supply voltage, the third control signal 120 is set to the supply voltage, and the fourth control signal 122 is set to half the supply voltage. This causes the bottom switching element 112 and the ground switching element 114 to be on, and the supply switching element 108 and the top switching element 110 to be off (shown as dotted lines in FIG. 7B).

During this phase, the first terminal of the switching capacitor 126 is floating, effectively disconnecting the switching capacitor 126 from the inductor 132. Thus, during the second phase of operation 702, the first, second, third and fourth control signals 116, 118, 120 and 122 cause the inductor 132 to supply the drive current to the output node 124 due to a magnetic field collapse across the inductor 132. After the second phase 702 is completed, the control signals 116, 118, 120 and 122 enter a third phase of operation.

Figure 8A:
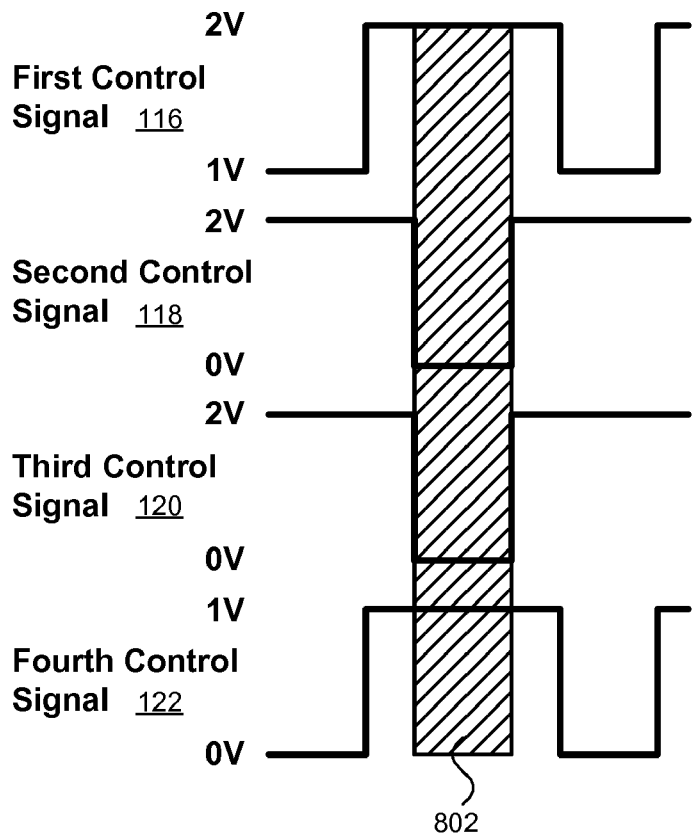
FIGS. 8A and 8B show a third phase of four operational phases of the voltage converter circuit when the desired voltage at the output node is between half the supply voltage and the ground voltage.
Figure 8B:
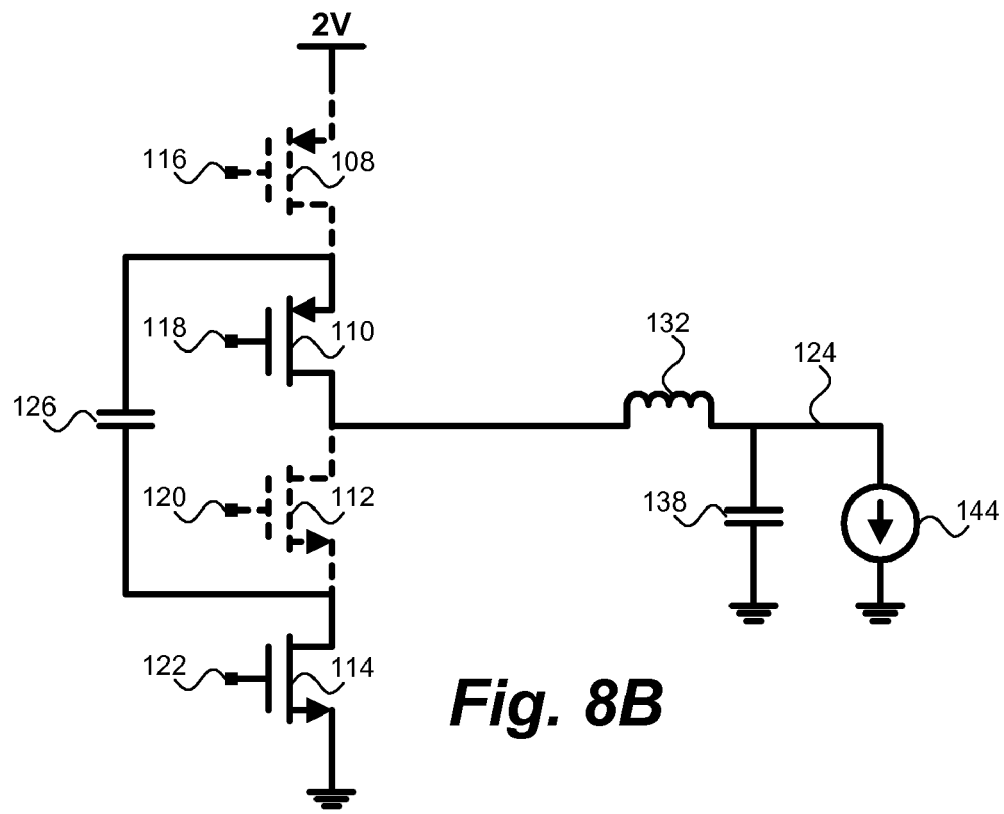

FIGS. 8A and 8B show the third phase 802 of the four operational phases when the desired voltage at the output node 124 is between half the supply voltage and the ground voltage. During the third phase 802 of operation, the first control signal 116 is set to the supply voltage, and the second control signal 118 is set to the ground voltage, the third control signal 120 is set to the ground voltage, and the fourth control signal 122 is set to half the supply voltage. This causes the top switching element 110 and the ground switching element 114 to be on, and the supply switching element 108 and the bottom switching element 112 to be off (shown as dotted lines in FIG. 8B).

During this phase, the drive current passes from the switching capacitor 126 through the inductor 132 to the output node 124. Thus, the energy previously added to the switching capacitor at the first phase (see FIGS. 6A and 6B) is used to supply the load through the inductor 132, again ramping up the magnetic field at the inductor 132. After the third phase 802 is completed, the control signals 116, 118, 120 and 122 enter a fourth phase of operation.

Figure 9A:
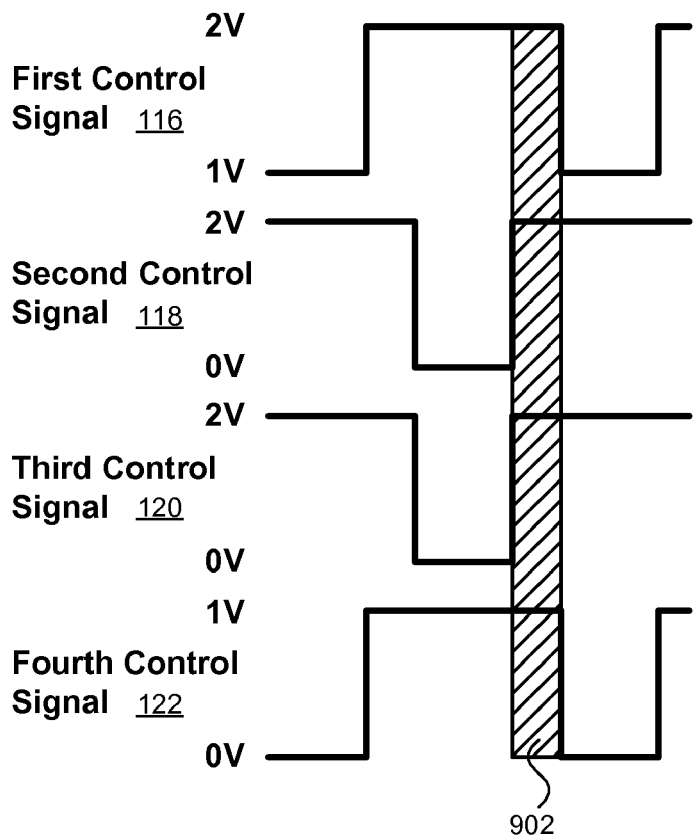
FIGS. 9A and 9B show a fourth phase of four operational phases of the voltage converter circuit when the desired voltage at the output node is between half the supply voltage and the ground voltage.
Figure 9B:
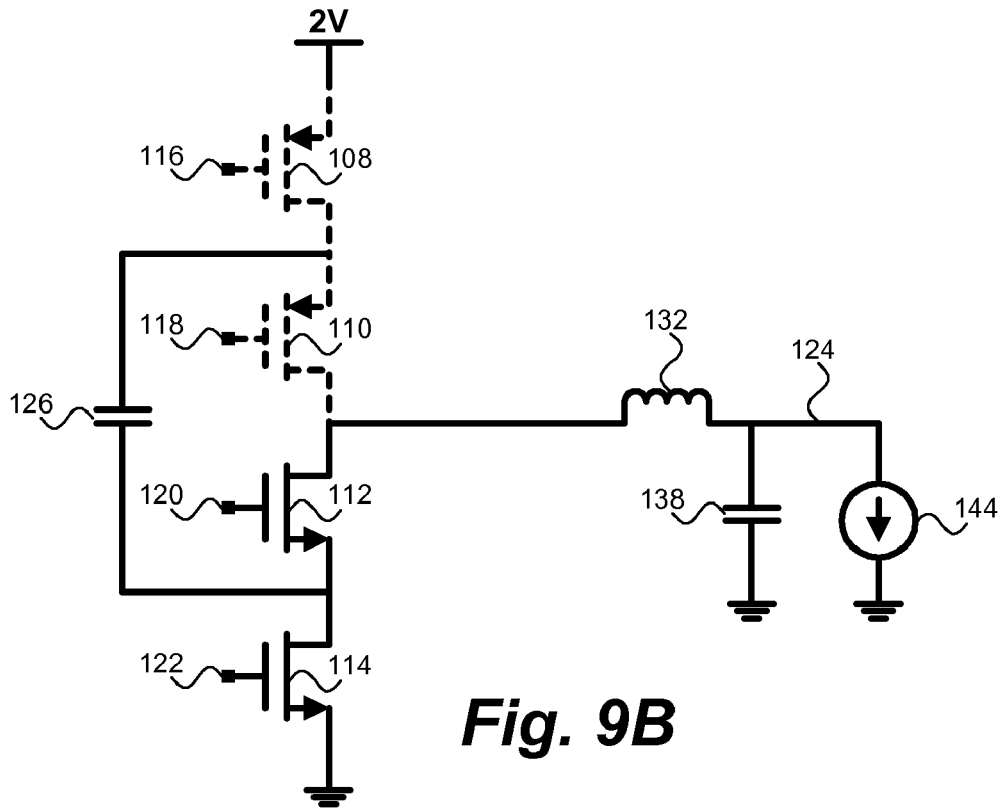

FIGS. 9A and 9B show the fourth phase 902 of the four operational phases when the desired voltage at the output node 124 is between half the supply voltage and the ground voltage. During the fourth phase 902 of operation, the first control signal 116 is set to the supply voltage, and the second control signal 118 is set to the supply voltage, the third control signal 120 is set to the supply voltage, and the fourth control signal 122 is set to half the supply voltage. This causes the bottom switching element 112 and the ground switching element 114 to be on, and the supply switching element 108 and the top switching element 110 to be off (shown as dotted lines in FIG. 9B).

During this phase, the switching capacitor is disconnected from the inductor such that the inductor supplies the drive current to the output node due to the magnetic field collapse across the inductor. Thus, the energy previously added to the switching capacitor at the first phase (see FIGS. 6A and 6B) is used to supply the load through the inductor 132, again ramping up the magnetic field at the inductor 132. After this phase is completed, the control signals 116, 118, 120 and 122 cycle back to the first phase 602.

Those skilled in the art will recognize that as the duty cycle of the second phase 702 and the fourth phase 902 is increased, the output node 124 moves closer to the ground voltage (i.e., 0V). Conversely, as the duty cycle of the second phase 702 and the fourth phase 902 is decreased, the output node 124 moves closer to half the supply voltage (i.e., 1V). Adjusting the duty cycle of the second phase 702 and the fourth phase 902 adjusts the voltage at the output node 124 between half the supply voltage and the ground voltage. Thus, the output voltage at the circuit load is proportional to a ratio of the duty cycle of the first and third phases of operation to the duty cycle of the second and fourth phases of operation.

Figure 10:
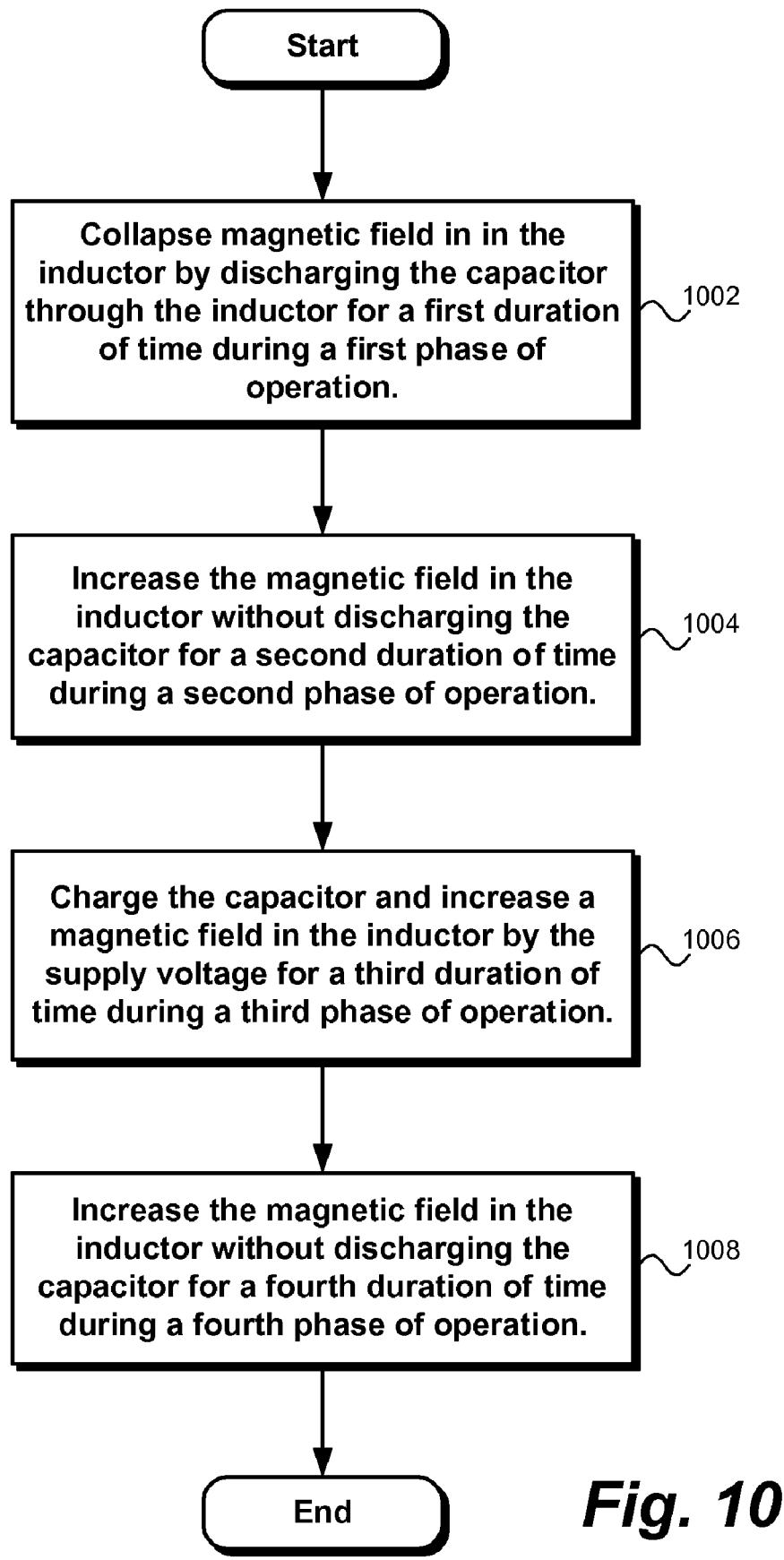
FIG. 10 is a flowchart of the steps performed in operating the converter circuit such that the output voltage is between the supply voltage and half the supply voltage.

In FIG. 10, a flowchart is provided illustrating the steps performed in operating the converter circuit such that the output voltage is between the supply voltage and half the supply voltage. As detailed above, the converter circuit includes a supply voltage, a capacitor, an inductor, and four stacked switching elements. Each switching element is adjustable from a low resistance state to a high resistance state by a control signal. The inductor outputs current to a circuit load.

Circuit operation begins at a first phase of operation 1002. This operation step is also shown in FIGS. 2A and 2B and is discussed above. During the first phase of operation 1002 a magnetic field in the inductor is collapsed by discharging the capacitor through the inductor for a first duration of time. The voltage across the capacitor is approximately half the supply voltage (built up in preceding operation cycles). Thus, when the inductor is switched from the supply voltage to half the supply voltage at the capacitor voltage, the magnetic field at the inductor collapses. After the first duration of time is completed, circuit operation moves to the second phase of operation 1004.

During the second phase of operation 1004, the magnetic field in the inductor is increased without discharging the capacitor for a second duration of time. This operation step is also shown in FIGS. 3A and 3B and is discussed above. At this phase the capacitor is bypassed as the inductor is connected to the supply voltage. The capacitor, removed from the current path, is left floating and cannot discharge. After the second duration of time is completed, circuit operation moves to the third phase of operation 1006.

During the third phase of operation 1006, the capacitor is placed back in the current path. The capacitor is charged and the magnetic field at the inductor is increased by the supply voltage for a third duration of time during a third phase of operation 1006. This operation step is also shown in FIGS. 4A and 4B and is discussed above. After the third duration of time is completed, circuit operation moves to the fourth phase of operation 1008.

During the fourth phase of operation 1008, the magnetic field in the inductor is increased without discharging the capacitor for a fourth duration of time. This operation step is also shown in FIGS. 5A and 5B and is discussed above. At this phase the capacitor is bypassed as the inductor is connected to the supply voltage. The capacitor, removed from the current path, is left floating and cannot discharge. After the fourth duration of time is completed, circuit operation cycles back to the first phase of operation 1002.

As noted above, the converter circuit includes four stacked switching elements. Each switching element is adjustable from a low resistance state to a high resistance state by a control signal. Thus, cycling through the first, second, third and fourth phases of operation in sequence is achieved by modifying the control signal at each switching element.

Figure 11:
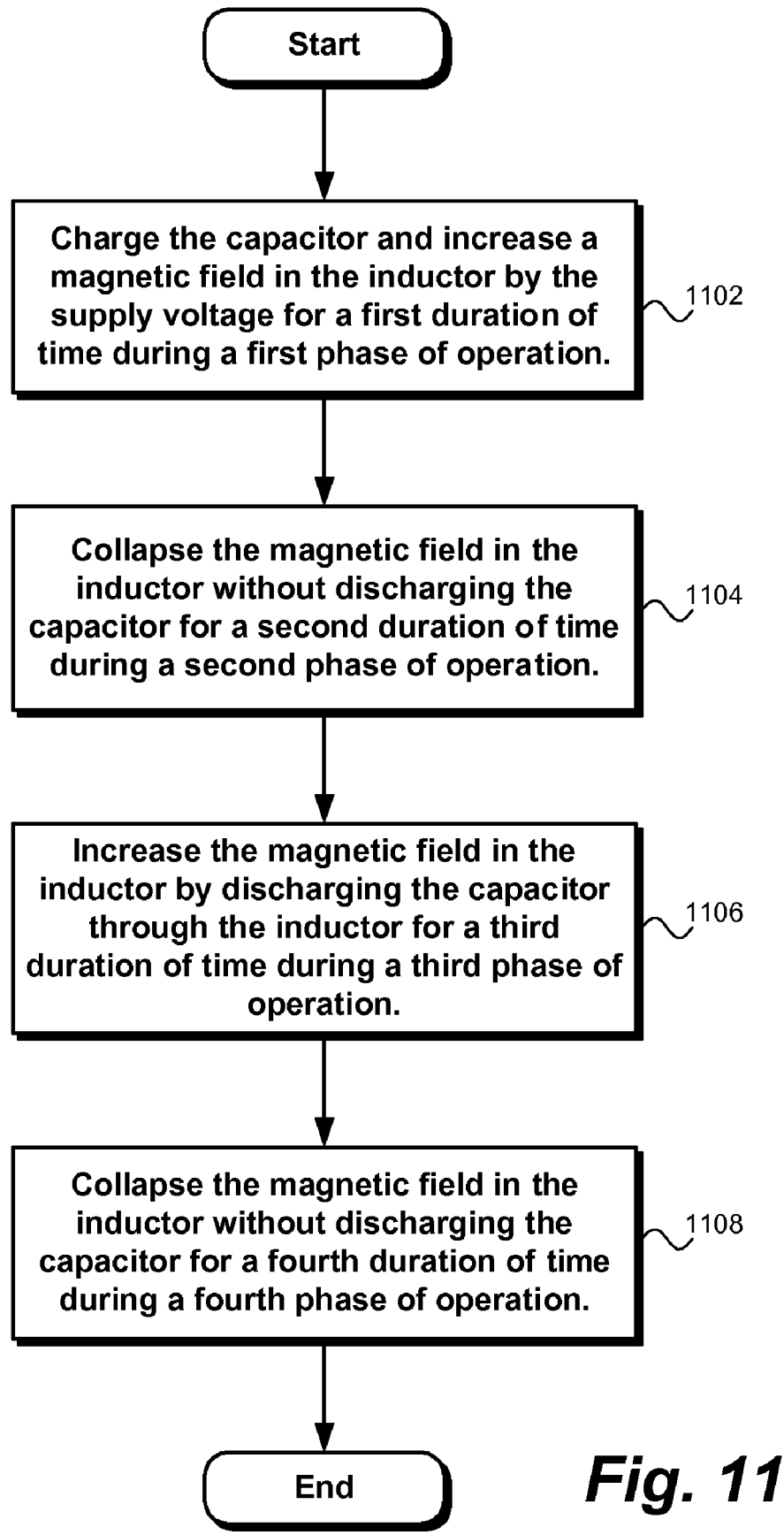
FIG. 11 is a flowchart of the steps performed in operating the converter circuit such that the output voltage is between half the supply voltage and the ground voltage.

FIG. 11 is a flowchart of the steps performed in operating the converter circuit such that the output voltage is between half the supply voltage and the ground voltage.

Circuit operation begins at a first phase of operation 1102. During the first phase of operation 1102 the capacitor is charged and a magnetic field in the inductor is increased by the supply voltage for a first duration of time. This operation step is also shown in FIGS. 6A and 6B and is discussed above. After the first duration of time is completed, circuit operation moves to the second phase of operation 1104.

During the second phase of operation 1104, the magnetic field in the inductor is collapsed without discharging the capacitor for a second duration of time. This operation step is also shown in FIGS. 7A and 7B and is discussed above. At this phase the capacitor is bypassed as the inductor is connected to the ground voltage. The capacitor, removed from the current path, is left floating and cannot discharge. After the second duration of time is completed, circuit operation moves to the third phase of operation 1106.

During the third phase of operation 1106, the capacitor is placed back in the current path. The magnetic field in the inductor is increased as the capacitor is discharges through the inductor for a third duration of time during a third phase of operation 1106. This operation step is also shown in FIGS. 8A and 8B and is discussed above. After the third duration of time is completed, circuit operation moves to the fourth phase of operation 1108.

During the fourth phase of operation 1108, the magnetic field in the inductor is collapsed without discharging the capacitor for a fourth duration of time during. This operation step is also shown in FIGS. 9A and 9B and is discussed above. Again, the capacitor is bypassed as the inductor is connected to the ground voltage. The capacitor, removed from the current path, is left floating and cannot discharge. After the fourth duration of time is completed, circuit operation cycles back to the first phase of operation 1102.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A voltage converter circuit comprising:
   a supply node receiving a supply voltage;
   a ground node receiving a ground voltage;
   a supply switching element including a first supply terminal, a second supply terminal and a supply control terminal, the first supply terminal electrically connected to the supply node and the supply control terminal receiving a first control signal, the supply control terminal controlling the resistance between the first supply terminal and the second supply terminal;
   a top switching element including a first top terminal, a second top terminal and a top control terminal, the first top terminal electrically connected to the second supply terminal, the top control terminal receiving a second control signal, the top control terminal controlling the resistance between the first top terminal and the second top terminal;
   a bottom switching element including a first bottom terminal, a second bottom terminal and a bottom control terminal, the first bottom terminal electrically connected to the second top terminal, the bottom control terminal receiving a third control signal, the bottom control terminal controlling the resistance between the first bottom terminal and the second bottom terminal;
   a ground switching element including a first ground terminal, a second ground terminal and a ground control terminal, the first ground terminal electrically connected to the second bottom terminal, the second ground terminal electrically connected to the ground node, the ground control terminal receiving a fourth control signal, the ground control terminal controlling the resistance between the first ground terminal and the second ground terminal;
   an output node substantially adjustable between the supply voltage and the ground voltage, the voltage at the output node controlled by application of the first, second, third and fourth control signals;
   a switching capacitor including a first switching capacitor terminal and a second switching capacitor terminal, the first switching capacitor terminal electrically connected to the second source terminal and the first top terminal, the second switching capacitor terminal electrically connected to the second bottom terminal and the first ground terminal;
   an inductor including a first inductor terminal and a second inductor terminal, the first inductor terminal electrically connected to the second top terminal and the first bottom terminal, the second inductor terminal electrically connected to the output node; and
   a load capacitor including a first load capacitor terminal and a second load capacitor terminal, the first load capacitor terminal electrically connected to the second inductor terminal and the output node, the second load capacitor terminal connected to the ground node.

2. The voltage converter circuit of claim 1, further comprising:
   wherein the voltage converter is cycled through four sequential phases of operation, the four sequential phases of operation comprising:
   a first phase of operation wherein the first, second, third and fourth control signals cause the inductor to drive a drive current to the output node from the switching capacitor;
   a second phase of operation wherein the first, second, third and fourth control signals cause the inductor to drive the drive current to the output node from the supply voltage node;
   a third phase of operation wherein the first, second, third and fourth control signals cause the switching capacitor and the inductor to be coupled in series circuit such that the drive current passes from the supply node through the switching capacitor and the inductor to the output node and such that the switching capacitor is charged by the drive current; and
   a fourth phase of operation wherein the first, second, third and fourth control signals cause the inductor to drive the drive current through to the output voltage node from the supply voltage cause the switching capacitor to be disconnected from the inductor such that the inductor supplies the drive current to the output node due to a magnetic field collapse across the inductor.

3. The voltage converter circuit of claim 2, wherein:
   during the first phase of operation, the supply switching element is off, the top switching element is on, the bottom switching element is off, and the ground switching element is on;
   during the second phase of operation, the supply switching element is on, the top switching element is on, the bottom switching element is off, and the ground switching element is off;

during the third phase of operation, the supply switching element is on, the top switching element is off, the bottom switching element is on, and the ground switching element is off; and during the fourth phase of operation, the supply switching element is on, the top switching element is on, the bottom switching element is off, and the ground switching element is off.

4. The voltage converter circuit of claim 2, wherein:

during the first phase of operation, the first control signal is set to the supply voltage, the second control signal is set to the ground voltage, the third control signal is set to the ground voltage, and the fourth control signal is set to half the supply voltage;

during the second phase of operation, the first control signal is set to half the supply voltage, and the second control signal is set to the ground voltage, the third control signal is set to the ground voltage, and the fourth control signal is set to the ground voltage;

during the third phase of operation, the first control signal is set to half the supply voltage, the second control signal is set to the supply voltage, the third control signal is set to the supply voltage, and the fourth control signal is set to the ground voltage; and during the fourth phase of operation, the first control signal is set to half the supply voltage, and the second control signal is set to the ground voltage, the third control signal is set to the ground voltage, and the fourth control signal is set to the ground voltage.

5. The voltage converter circuit of claim 1, further comprising:

wherein the voltage converter is cycled through four sequential phases of operation, the four sequential phases of operation comprising:

a first phase of operation wherein the first, second, third and fourth control signals cause the switching capacitor and the inductor to be coupled in series circuit such that a drive current passes from the supply node through the switching capacitor and the inductor to the output node and such that the switching capacitor is charged by the drive current;

a second phase of operation wherein the first, second, third and fourth control signals cause the switching capacitor to be disconnected from the inductor such that the inductor supplies the drive current to the output node due to a magnetic field collapse across the inductor;

a third phase of operation wherein the first, second, third and fourth control signals cause the drive current to pass from the switching capacitor through the inductor to the output node; and a fourth phase of operation wherein the first, second, third and fourth control signals cause the switching capacitor to be disconnected from the inductor such that the inductor supplies the drive current to the output node due to the magnetic field collapse across the inductor.

6. The voltage converter circuit of claim 5, wherein:

during the first phase of operation, the supply switching element is on, the top switching element is off, the bottom switching element is on, and the ground switching element is off;

during the second phase of operation, the supply switching element is off, the top switching element is off, the bottom switching element is on, and the ground switching element is on;

during the third phase of operation, the supply switching element is off, the top switching element is on, the bottom switching element is off, and the ground switching element is on; and during the fourth phase of operation, the supply switching element is off, the top switching element is off, the bottom switching element is on, and the ground switching element is on.

7. The voltage converter circuit of claim 5, wherein:

during the first phase of operation, the first control signal is set to half the supply voltage, the second control signal is set to the supply voltage, the third control signal is set to the supply voltage, and the fourth control signal is set to the ground voltage;

during the second phase of operation, the first control signal is set to the supply voltage, and the second control signal is set to the supply voltage, the third control signal is set to the supply voltage, and the fourth control signal is set to half the supply voltage;

during the third phase of operation, the first control signal is set to the supply voltage, the second control signal is set to the ground voltage, the third control signal is set to the ground voltage, and the fourth control signal is set to half the supply voltage; and during the fourth phase of operation, the first control signal is set to the supply voltage, and the second control signal is set to the supply voltage, the third control signal is set to the supply voltage, and the fourth control signal is set to half the supply voltage.

8. A method of operating a converter circuit, the converter circuit including a supply voltage, a capacitor and an inductor, the inductor outputting current to a circuit load, the method comprising:

collapsing a magnetic field in the inductor by discharging the capacitor through the inductor for a first duration of time during a first phase of operation;

increasing the magnetic field in the inductor without discharging the capacitor for a second duration of time during a second phase of operation;

charging the capacitor and increasing a magnetic field in the inductor by the supply voltage for a third duration of time during a third phase of operation;

increasing the magnetic field in the inductor without discharging the capacitor for a fourth duration of time during a fourth phase of operation; and cycling through the first, second, third and fourth phases of operation in sequence.

9. The method of claim 8, wherein an output voltage at the circuit load is proportional to a ratio of the duty cycle of the first and third phases of operation to the duty cycle of the second and fourth phases of operation.

10. The method of claim 8, wherein:

the converter circuit includes four stacked switching elements, each switching element adjustable from a low resistance state to a high resistance state by a control signal; and cycling through the first, second, third and fourth phases of operation in sequence by modifying the control signal at each switching element.

11. A method of operating a converter circuit, the converter circuit including a supply voltage, a capacitor and an inductor, the inductor outputting current to a circuit load, the method comprising:

charging the capacitor and increasing a magnetic field in the inductor by the supply voltage for a first duration of time during a first phase of operation;

collapsing the magnetic field in the inductor without discharging the capacitor for a second duration of time during a second phase of operation;

increasing the magnetic field in the inductor by discharging the capacitor through the inductor for a third duration of time during a third phase of operation;

collapsing the magnetic field in the inductor without discharging the capacitor for a fourth duration of time during a fourth phase of operation; and cycling through the first, second, third and fourth phases of operation in sequence.

12. The method of claim 11, wherein an output voltage at the circuit load is proportional to a ratio of the duty cycle of the first and third phases of operation to the duty cycle of the second and fourth phases of operation.

13. The method of claim 11, wherein:

the converter circuit includes four stacked switching elements, each switching element adjustable from a low resistance state to a high resistance state by a control signal; and cycling through the first, second, third and fourth phases of operation in sequence by modifying the control signal at each switching element.

* * * * *